United States Patent [19]
Nobe et al.

[11] Patent Number: 5,506,774
[45] Date of Patent: Apr. 9, 1996

[54] NAVIGATION APPARATUS

[75] Inventors: Kenichi Nobe; Morio Araki, both of Tsurugashima, Japan

[73] Assignee: Pioneer Electronic Corporation, Tokyo, Japan

[21] Appl. No.: 233,255

[22] Filed: Apr. 26, 1994

[30] Foreign Application Priority Data

Apr. 26, 1993 [JP] Japan ................................ 5-099806

[51] Int. Cl.⁶ .................... G01C 21/08; G01C 21/18; G01S 5/16
[52] U.S. Cl. .................. 364/424.05; 364/449; 340/990; 340/995; 342/457
[58] Field of Search ........................... 364/436, 437, 364/438, 444, 449, 457; 340/990, 991, 992, 993, 994, 995; 342/450, 457

[56] References Cited

U.S. PATENT DOCUMENTS

| | | | |
|---|---|---|---|
| 5,031,104 | 7/1991 | Ikeda et al. | 364/449 |
| 5,103,400 | 4/1992 | Yamada et al. | 364/444 |
| 5,184,303 | 2/1993 | Link | 364/444 |
| 5,187,667 | 2/1993 | Short | 364/444 |
| 5,243,529 | 9/1993 | Kashiwazaki | 364/444 |
| 5,272,638 | 12/1993 | Martin et al. | 364/444 |
| 5,291,412 | 3/1994 | Tamai et al. | 364/444 |
| 5,291,413 | 3/1994 | Tamai et al. | 364/444 |
| 5,291,414 | 3/1994 | Tamai et al. | 364/444 |
| 5,293,163 | 3/1994 | Kakihara et al. | 364/444 |
| 5,303,159 | 4/1994 | Tamai et al. | 364/444 |
| 5,311,434 | 5/1994 | Tamai | 364/444 |
| 5,323,321 | 6/1994 | Smith, Jr. | 364/444 |
| 5,345,388 | 9/1994 | Kashiwazaki | 364/444 |
| 5,359,527 | 10/1994 | Takanabe et al. | 364/444 |
| 5,369,588 | 11/1994 | Hayami et al. | 364/444 |

FOREIGN PATENT DOCUMENTS

| | | |
|---|---|---|
| 0246452 | 11/1987 | European Pat. Off. . |
| 0323229 | 7/1989 | European Pat. Off. . |
| 0372840 | 6/1990 | European Pat. Off. . |

OTHER PUBLICATIONS

VNIS 91' Vehicle Navigation and Information Systems Conference Proceedings, Oct. 20–23, 1991, "Map Navigation Software of the Electro–Multivision of the 91' Toyota Soarer", Dearborn, Michigan, pp. 463–473.

*Primary Examiner*—Kevin J. Teska
*Assistant Examiner*—Tyrone V. Walker
*Attorney, Agent, or Firm*—Kane, Dalsimer, Sullivan, Kurucz, Levy, Eisele and Richard

[57] ABSTRACT

A navigation apparatus equipped in a movable body, is provided with: a position measuring device for measuring a self-position of the movable body; an input device for inputting a destination position; a displaying device for displaying a present position, which is measured by the position measuring device, and an optimum course from the present position to the destination position; a memory device for storing map information including course data beforehand; and an optimum course searching device coupled to the memory device and the displaying device, for evaluating various courses from the present position to the destination position by use of the map information stored in the memory device, and searching the optimum course by selecting a course, which evaluation is the best one among the evaluated various courses, as the optimum course.

17 Claims, 12 Drawing Sheets

NAVIGATION APPARATUS

BACKGROUND OF THE INVENTION

1. Field of the Invention

The present invention relates to a navigation apparatus, which carries out an indication display of a present position, an advance course, etc, to support a driving operation of a movable body, such as a car. Especially, the present invention relates to a navigation apparatus, to which a destination position is firstly set and inputted, and which obtains an optimum movement course on the basis of map information inputted beforehand to display the course to guide.

2. Description of the Related Art

In a navigation apparatus mounted in a vehicle etc., it is demanded to measure a present position and an advance direction of the self-vehicle precisely, display map information corresponding to the present position of the self-vehicle precisely and rapidly by a display device etc., one after another, and provide a driver with a course from the present position to the destination position.

The navigation apparatus mounted in a vehicle or car etc., selects a course, which has an azimuth closest to the azimuth from the present position to the destination position of the self-vehicle, by use of position information as for the inputted destination position and various courses to the destination position from the present position, so that the navigation apparatus displays the advance course to guide from the present position to the destination position.

Figure 11:
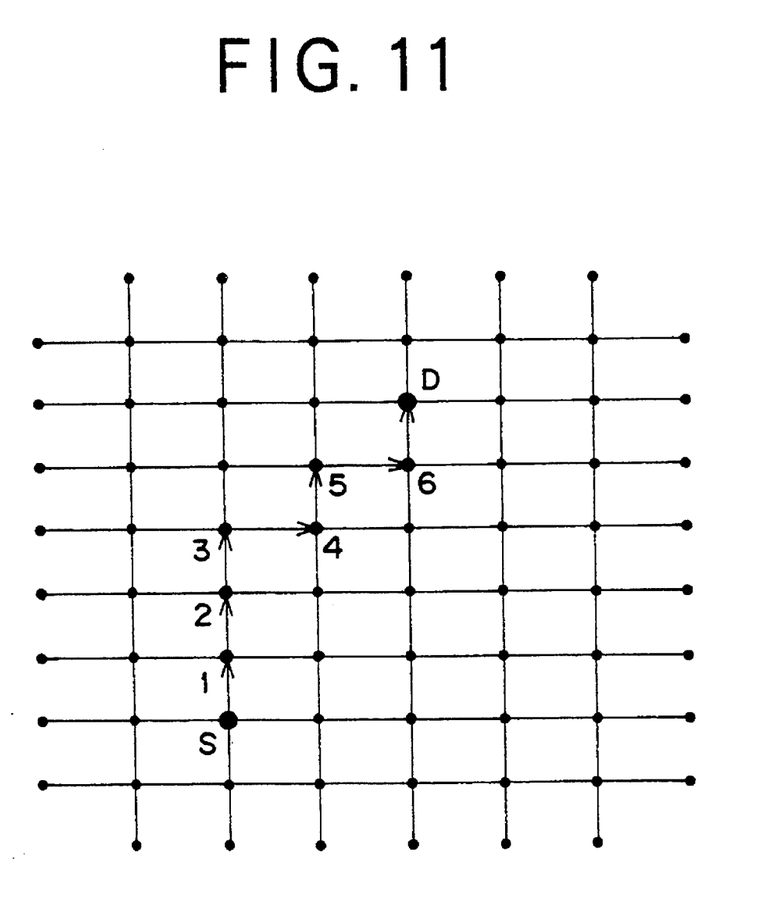
FIG. 11 is a diagram which indicates a search course in case of using a navigation apparatus of the related art.

FIG. 11 indicates an example of a course searching operation in case of using such a navigation apparatus. In FIG. 11, the reference numeral S represents a present position, the reference numeral D represents a destination position, and the numbers 1 to 6 represent crossings through which the self-vehicle are guided to pass respectively. In case of the navigation apparatus, which selects the course having the azimuth closest to the azimuth from the present position of the self-vehicle to the destination position, when the destination position D is inputted thereto, the navigation apparatus displays such a course to guide that the self-vehicle advances straight from the present position S to the crossing 3, turns to the right at the crossing 3, turns to the left at the crossing 4, turns to the right at the crossing 5 and turns to the left at the crossing 6, so as to reach the destination position D. In this manner, the navigation apparatus is constructed to support the driving operation.

Figure 12:
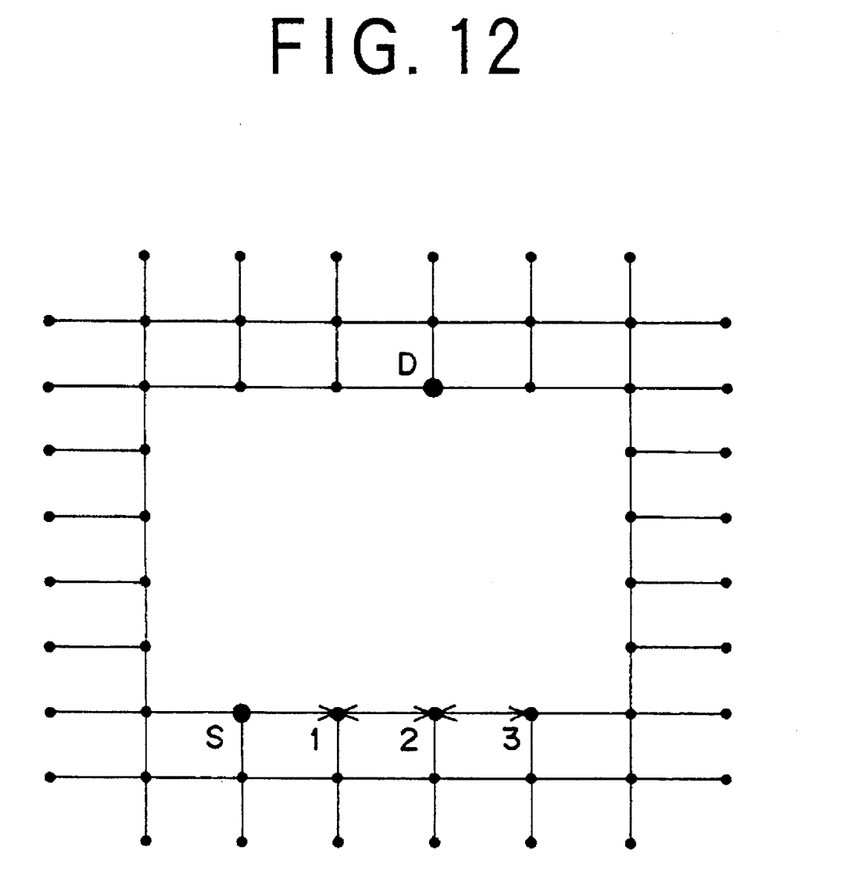
FIG. 12 is another diagram which indicates a search course in case of using a navigation apparatus of the related art.

However, in case of searching a course shown in FIG. 12 by use of such a navigation apparatus, since a course does not exist between the present position S and the destination position D, an infinite loop is generated such that the course to the destination position D may be unable to be found out. Namely, in FIG. 12, if the destination position D is inputted at the present position S, the self-vehicle advances straight from the present position S to the crossing 3, makes a U-turn at the crossing 3, and advances straight to the crossing 1. Therefore, the navigation apparatus displays such a movement course to guide that the self-vehicle takes a round trip between the crossing 1 and the crossing 3 henceforth. In this case, by setting, as a prohibition position, a position in case that the self-vehicle reaches the end point of data, or a position in case that all advancing directions of the self-vehicle are surrounded by the points where the self-vehicle has passed once in the search, and by giving a process to return the self-vehicle to one previous position without going to the prohibited position, it may be possible to overcome the above mentioned problem.

Figure 13:
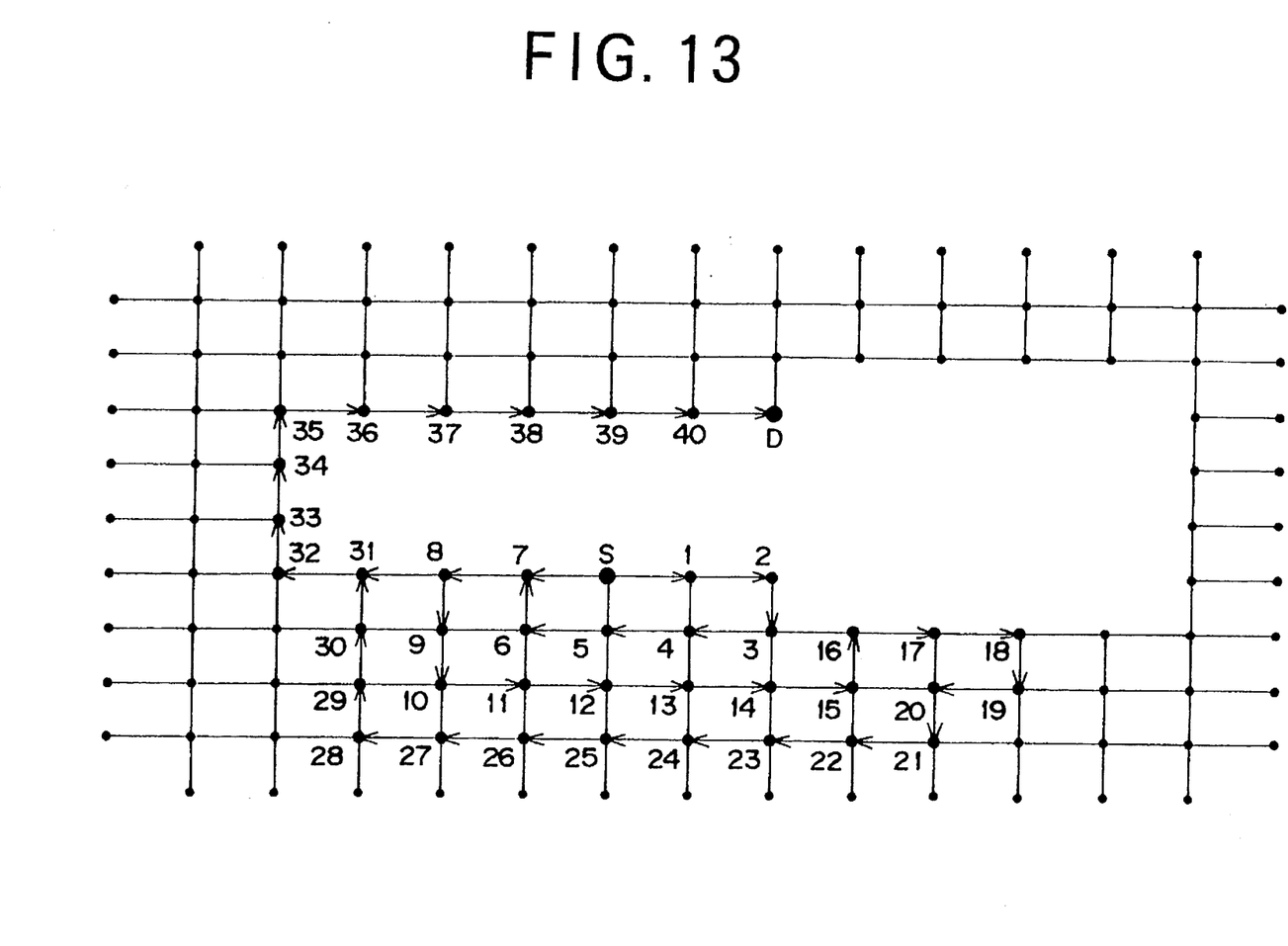
FIG. 13 is another diagram which indicates a search course in case of using a navigation apparatus of the related art.

However, in this case, many courses should be searched until it reaches to the destination position D, as shown in FIG. 13, so that the process becomes complicated and a long searching time becomes necessary.

SUMMARY OF THE INVENTION

It is therefore an object of the present invention to provide a navigation apparatus, which can search an optimum course from a present position to a destination position for a short time, and which can perform the driving operation support effectively.

The above object of the present invention can be achieved by a navigation apparatus, equipped in a movable body. The navigation apparatus is provided with: a position measuring device for measuring a self-position of the movable body; an input device for inputting a destination position; a displaying device for displaying a present position, which is measured by the position measuring device, and an optimum course from the present position to the destination position; a memory device for storing map information including course data beforehand; and an optimum course searching device coupled to the memory device and the displaying device, for evaluating various courses from the present position to the destination position by use of the map information stored in the memory device, and searching the optimum course by selecting a course, which evaluation is the best one among the evaluated various courses, as the optimum course.

According to the construction of the present invention, when a destination position is set and inputted to the navigation apparatus by the input device, the optimum course searching device acts as follows. Namely, various courses from the present position to the destination position are evaluated by use of map information (for example, a road distance, a road width, traffic jam formation, etc.) of every place position stored beforehand in the memory device. Then, a course, which evaluation is the best one among those courses, is selected as the optimum course, and the selected optimum course is displayed by the display device as an advance course to guide the user. In this manner, the optimum course can be searched efficiently, and an driving operation support can be effectively performed according to the present invention.

In one aspect of the present invention, the optimum course searching device evaluates the various courses on the basis of a predetermined function of parameters, which comprise at least one of a road distance, a road width, a degree of traffic jam, a straight advance nature of a road, a road charge, the number of right turn times and the number of left turn times, in the map information. Thus, the optimum course can be selected from various points of view e.g. the time to drive, the ease to drive, the economics to drive and so on.

Further, in this case, the predetermined function is preferably a weighted sum of the parameters with weighting factors. Thus, the manner to select an optimum course can be changed by simply changing the weighting factors. In this case, it is more preferable that the weighting factors are variable by an operation input through the input device, so that the user can easily change the weighting factors according to the degree of importance of each parameter for the user.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

The embodiments of the present invention will be explained with reference to following drawings.

Figure 1:
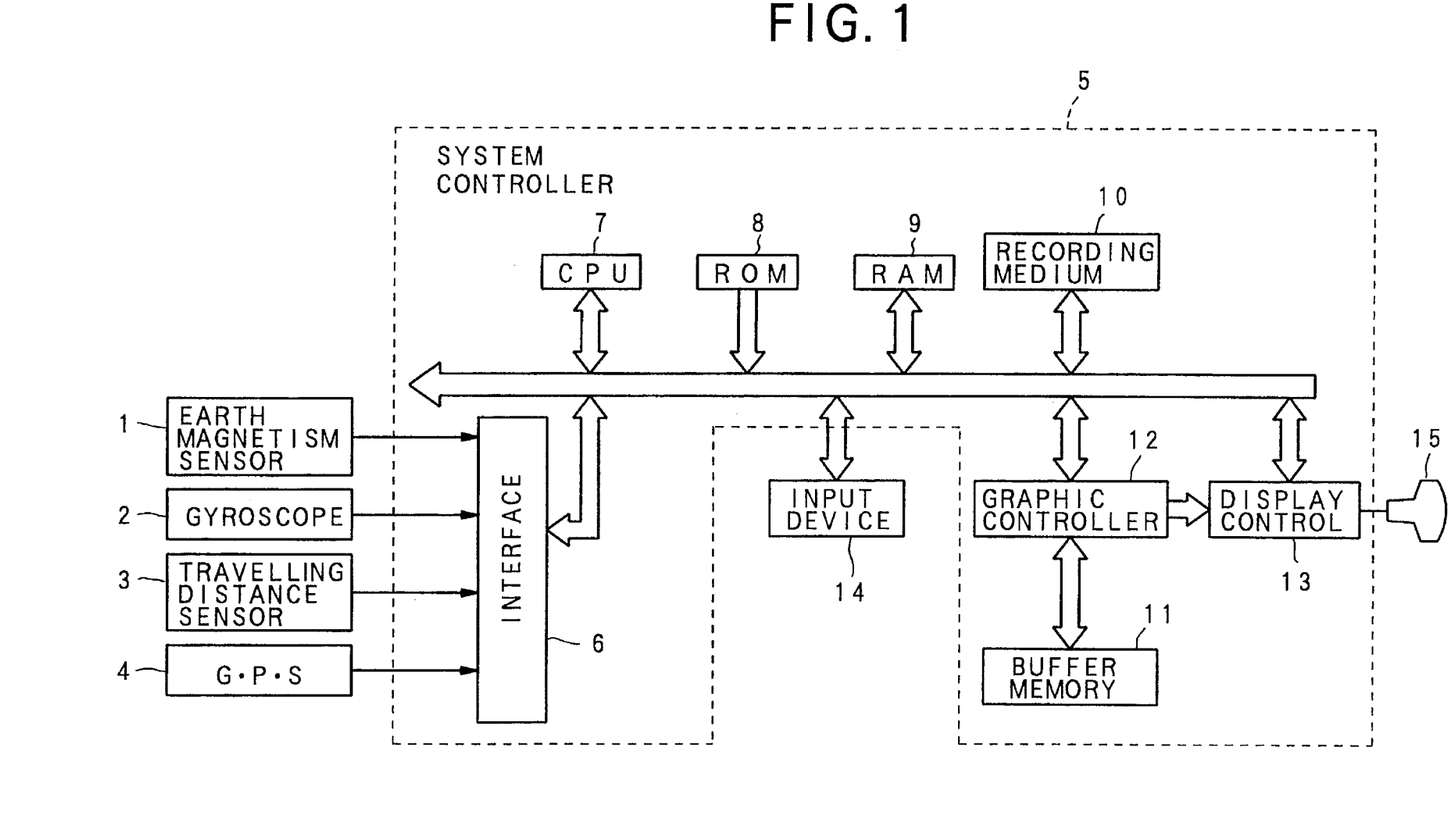
FIG. 1 is a block diagram of a navigation apparatus of the present invention.

FIG. 1 indicates a block diagram of an on-vehicle navigation apparatus according to the present invention. As shown in FIG. 1, the on-vehicle navigation apparatus is provided with: an earth magnetism sensor 1, which is an azimuth detection apparatus for outputting absolute azimuth angle data of the vehicle on the basis of a geomagnetism (earth magnetic field); a gyroscope 2, which is an angular velocity sensor for detecting an angular speed accompanied by the direction change of the vehicle, and outputting angular speed data; a travelling distance sensor 3 for detecting whether the vehicle is moving or stopped, outputting the state, and outputting a travelling speed and a travelling distance data of the vehicle; and a GPS (Global Positioning System) measurement device 4 for receiving electric waves from a plurality of GPS satellites, performing a calculation to generate data such as latitude, longitude, height, and an advance direction of the self-vehicle, and outputting them; a system controller 5 for performing various processes, such as an operation and a control; an input device 14, which is an apparatus for carrying out an operation input to the system controller 5; and a display device 15, which may consist of a liquid crystal display device (LCD) and a CRT, for example.

The system controller 5 is provided with: an interface 6, to which the outputs of the earth magnetism sensor 1, the gyroscope 2, the travelling distance sensor 3 and the GPS measurement device 4, are inputted, for performing an A/D conversion etc.; a CPU 7 (Central Processing Unit) for performing various operation and control according to a program; a ROM (Read Only Memory) 8, to which process programs of various kinds and necessary information for the navigation are written beforehand; a RAM (Random Access Memory) 9, to and from which information necessary to perform the program is written and read out; a recording medium 10, which may consist of a CD-ROM, an IC (Integrated Circuit) card, etc., and to which digitized map information is recorded; a buffer memory 11, which may consist of a V-RAM (video RAM) etc., and which is a frame buffer for temporarily storing image information which is data-expanded to be instantly displayed; a graphic controller 12 for drawing graphic data, which is sent by the instructions of the CPU 7, such as map information, to the buffer memory 11, and outputting the drawing data as image information; and a display control circuit 13, to which image information outputted from the graphic controller 12 is inputted, for controlling an image display of the display device 12.

In the navigation apparatus having the above mentioned constitution, when the system controller 5 is started, the system controller 5 performs a following control. Firstly, information to access map display information etc. and display information of a self-vehicle position mark etc. are read from the recording medium 10, and are stored to the RAM 9. Nextly, data of latitude and longitude, and advance direction data of the self-vehicle, which are self-vehicle position information, are read from the GPS measurement device 4, while the map data corresponding to the self-vehicle position are read from the recording medium 10 and are sent to the graphic controller 12, so as to display the map including the present position on the display device 15. Further, the process of displaying the self-vehicle position mark on the map from the self-vehicle position information and the advance direction data, is performed. Successively, the self-vehicle position information and the advance direction data are periodically read from the GPS measurement device 4, so that updating processes of the display position and the direction of the self-vehicle position mark, and if necessary, the updating process of the display map, are performed. Moreover, output data of the earth magnetism sensor 1, the gyroscope 2 and the travelling distance sensor 3, are periodically read and inputted to the system controller 5 through the interface 6. The self-vehicle position and the advance direction are computed by a predetermined calculation operation from the output data. A correction process is performed by comparing the computed data and the data from the GPS measurement device 4, and adjusting a mutual error thereof.

Moreover, the navigation apparatus of the present embodiment has an optimum course searching function. According to this optimum course searching function, the system controller 5 receives an input of the destination position to be set, firstly in the same manner as the conventional case, by an operation input. After receiving the input, the road information (such as a road distance and a road width), a traffic jam information etc. of various courses to the destination position from the present position, which are stored in the recording medium 10, are stored into the RAM 9. And, in the movement from the present position, various courses from the present position to the destination position are evaluated by use of the road information etc. of each place positions, and the course which evaluation value is the best one among the evaluated courses, is selected as an optimum course. The selected optimum course is displayed as an advance course to guide.

FIRST EMBODIMENT

Figure 2:
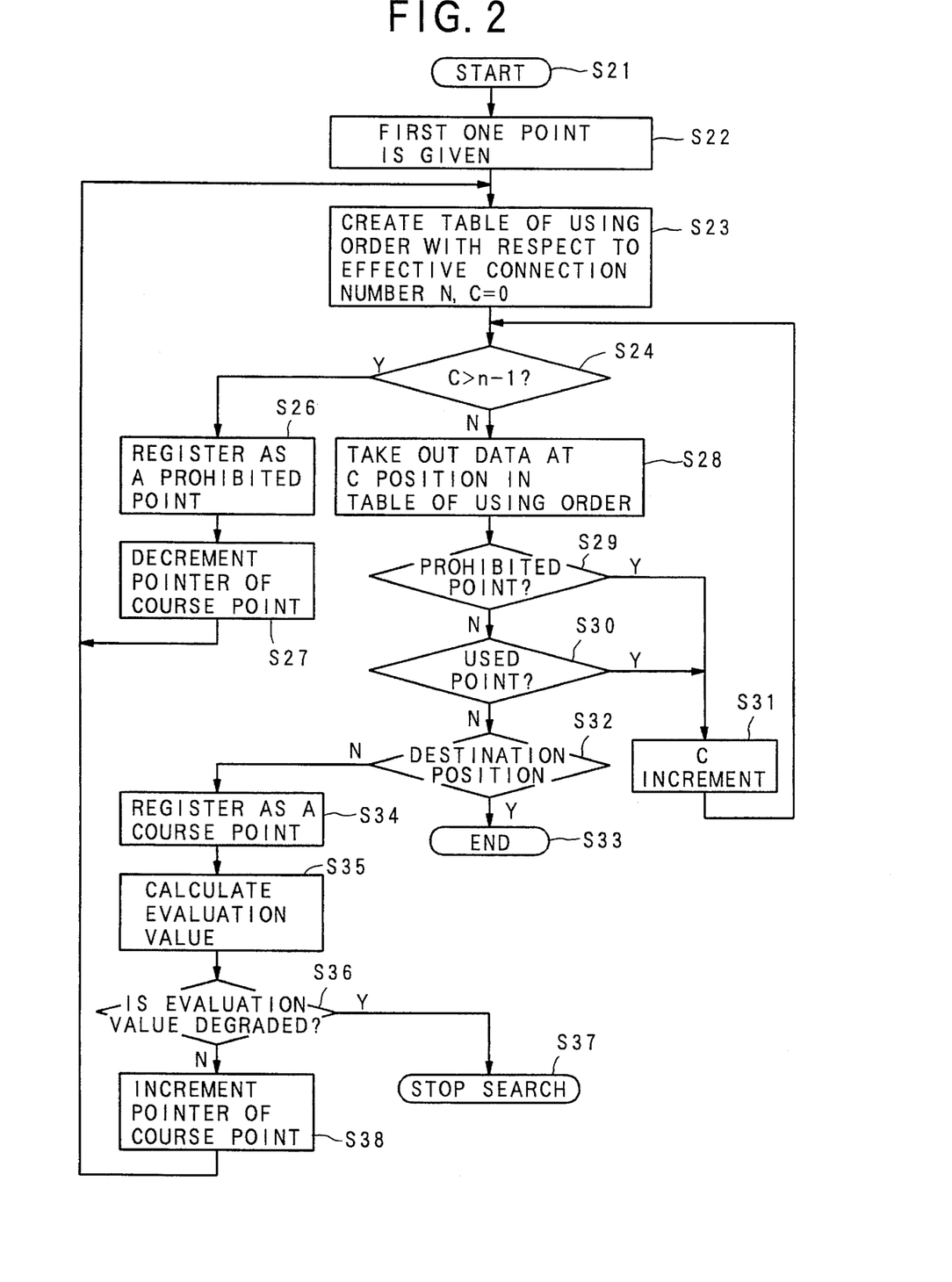
FIG. 2 is a flow chart, which indicates an operation of a first embodiment of the navigation apparatus having an optimum course searching function according to the present invention.
Figure 3:
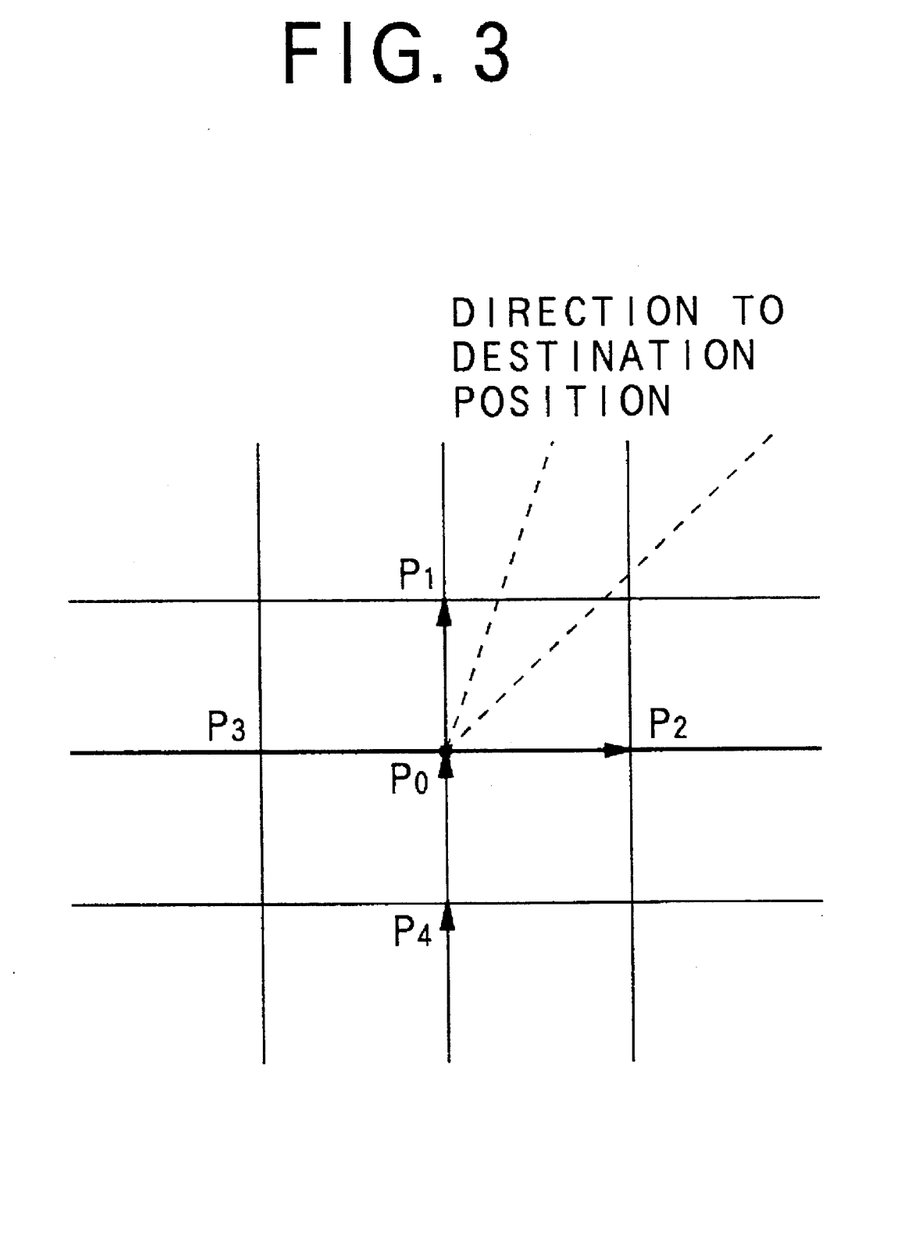
FIG. 3 is a diagram of the searching method in the embodiment.

FIG. 2 indicates a flow chart of a first embodiment of the navigation apparatus which has the optimum course searching function according to the present invention, and FIG. 3 indicates a diagram of a searching method in the first embodiment.

When the searching function is started (step S21), a first point (point $P_0$ of FIG. 3) is specified to be an objective point for search (step S22). Nextly, a table of using order is created with respect to the objective points for search of an effective connection number N (which is defined and explained below) and the count value C of the counter is set to be zero (step S23). For example, in case of FIG. 3, a point $P_1$, which azimuth is the closest to the azimuth to the destination position, is adopted at first. Moreover, in order to increase the processing speed, it is preferable to limit the objective points for search within an oval, which focuses are located at the present position and the destination position.

Here, the effective connecting number N is defined as the number of objective points for search, to which the vehicle can move from the point $P_0$. For example, if the road between the point $P_0$ for search and the point $P_4$ is a one-way road from the point $P_4$ to the point $P_0$, it is not possible to directly move from the point $P_0$ to the point $P_4$. In this case, the effective connection number N becomes 3.

Nextly, it is judged whether C> N−1 or not (step S24). In this case, since C=0 and N−1=3−1=2, it becomes C<N−1. If it is not C>N−1 (step S24, NO), the position data at the count value C is read out from the table of using order in the recording medium 10 (FIG. 2, step S28).

Nextly, it is judged whether the point $P_1$ for search is a prohibited point or not (step S29). Here, the prohibited point is defined as a point which does not have a possibility to be selected as a course point in an optimum course. For example, the point is determined to be the prohibited point in case that it is the end point of data, in case that it is surrounded in all directions by the used points and so on. If the point $P_1$ for search is the prohibited point (step S29, YES), the count value C is incremented (step S31). The same steps as the above are repeated about the following objective point for search, for example the point $P_2$ of FIG. 3. On the other hand, if the point $P_1$ for search is not the prohibited point (step S29, NO), it is judged whether the point $P_1$ for search is a used point or not (step S30). Here, the used point is defined as a point which has been already used in the search process. If the point is the used point (step S30, YES), the count value C is incremented in the same manner as the above (step S31), and the same steps as the above are repeated about the following point for search.

If the point $P_1$ for search is not the used point (step S30, NO), it is judged whether the point $P_1$ for search is the destination position or not (step S32). If it is the destination position (step S32, YES), the searching operation is ended (step S33). On the other hand, if it is not the destination position (step S32, NO), the point for search is registered as a course point (step S34) and, the evaluation value is calculated (step S35). The calculation of the evaluation value is explained later.

Nextly, it is judged whether the calculated evaluation value is degraded or not (step S36). If the evaluation value is degraded (step S36, YES), the search is stopped (step S37). If the evaluation value is not degraded (step S36, NO), the course point pointer is incremented (step S38), and the same steps as the above are repeated with respect to the point $P_1$ for search instead of the point $P_0$.

Moreover, if it is C>N−1 (step S24, YES), the point $P_1$ for search is registered as the prohibited point (step S26). The course point pointer is decremented (step S27). Namely, the above mentioned steps are repeated with respect to the point $P_4$ for search, which is previous to the point $P_0$ just by one.

1) CALCULATION OF THE EVALUATION VALUE

Nextly, the calculation of the evaluation value at the step S35 will be explained. Generally, the optimum course is: (1) a course through which it takes short time to pass (e.g. which road distance is short, on which there is no traffic jam); (2) a course on which the driving operation is simple and which can be easily understood (e.g. which is a linear or straight course, the road width of which is wide); (3) a course which is an economical (e.g. which is not a toll road). In consideration of those elements, two examples of the evaluation equation are shown below.

$$\text{Evaluation value} = \quad (1)$$

$$W1\ \Sigma(\text{road distance parameter/road width parameter}) + $$
$$W2\ \Sigma\ (\text{degree of traffic jam parameter}) + $$
$$W3\ \Sigma\ (\text{straight advance nature parameter}) + $$
$$W4\ \Sigma\ (\text{charge parameter}) + $$
$$W5\ (\text{number of right turn time parameter}) + $$
$$W6\ (\text{number of left turn times parameter})$$

$$\text{Evaluation value} = \quad (2)$$

$$W1\ \Sigma\ \{(\text{road distance parameter/road width parameter}) \times $$
$$(\text{degree of traffic jam parameter}) \times $$
$$(\text{straight advance nature parameter}) \times (\text{charge parameter})\} + $$
$$W2\ (\text{number of right turn times parameter}) + $$
$$W3\ (\text{number of left turn times parameter})$$

Here, the reference numerals W1 to W6 in each equation represent weighting factors to the parameters respectively, which are varied according to the degree of importance for the user. In this manner, each of the evaluation equations is given in a form of convolution of the parameters with the weighting factors.

The sum (addition) in each term of the above evaluation equation is performed from the present position to the destination position by a unit of each node (each road section between crossings).

As the value obtained by each expression becomes less, the course becomes better. For example, if the road, which width is wide and on which the driving operation is easy, is considered as a top priority in the equation (1) by the user, the value of W1 is increased.

2) METHOD OF WEIGHTING

It will be explained separately as each parameter and as for a relation between parameters (whole parameters).

[1] One example of determining each parameter for the weighting method is explained below.

Road Distance Parameter: Since the time required to pass through a road becomes long in proportion to the road distance, the road distance parameter is determined to be increased in proportion to the road distance.

Road Width Parameter: For example, it is considered that ease to travel on a road is considerably different between a 1 lane road and a thin street road, but ease to travel on a road is not so different between a 1 lane road and a 2 lane road, or between a 2 lane road and a 3 lane road. Therefore, the road width parameter is not determined to be simply proportional to the road width, but the degree of change in ease to travel on a road is taken into consideration to determine it.

Degree of Traffic Jam Parameter: It is increased in proportion to an average speed at the time of traffic jam. In the future, the parameter can be determined by judging the degree of traffic jam from communication information etc. as explained below.

Straight Advance Nature (Linearity) Parameter: Here, the straight advance nature is defined as a straight nature between three points i.e. one crossing (course point) and its before and after points. The straight advance nature between three points can be obtained from the angle difference between the inflow angle and the outflow angle to and from the course point. In this case, the straight advance nature parameter is not determined to be simply proportional to the angle, but is determined such that a crookedness near a U-turn more conspicuously degrade the straight advance nature.

Charge Parameter: It is determined to be increased in proportion to the amount of money.

Number of Right Turn Times and Number of Left Turn Times Parameters: Those parameters are determined to be increased in proportion to the numbers.

In addition, in the future, VICS (Vehicle Information and Communication System) data may be taken in to the navigation apparatus, and the parameters for weighting may be determined to be changed on the basis of traffic jam information, traffic regulation information (e.g. information as for passing prohibited intervals) etc., which is obtained from the VICS data, although it is still at a stage of experiment.

[2] One example of weighting method between parameters is explained below.

Generally, when the evaluation value becomes degraded, it can be presumed that a road distance corresponding to it would become long. Here, weighting is performed on the basis of the length [m] of the road distance as a standard. In other word, a pseudo-distance is calculated as the evaluation value by each parameters and corresponding weighting factors. One example of the ratio between the parameters i.e. the weighting factors to calculate the pseudo-distance, obtained by an experiment (simulation by a computer), is shown below.

Road Distance: It is set as a standard.

Weighting Factor for Road Width: The term in the evaluation equation is (road distance/road width). The weighting factor is determined such that the value in this parenthesis is multiplied to be in the range of 0.5–2 times of the original value, due to the influence of the road width. Namely, the weighting factor is determined such that the value in the parenthesis become about 2 times of the original value in case of a thin street road, and become about 0.5 times in case of a 3 lane road.

Weighting Factor for Degree of Traffic Jam: It is determined by how much the average speed at the time of traffic jam is different from the average speed at the normal time.

Weighting Factor for Straight Advance Nature: It is determined to multiply the straight advance nature parameter to be about 1.5 times at the maximum, i.e. when the angle difference between the inflow angle and the outflow angle to and from a course point is the maximum at a vicinity of a U turn.

Weighting Factor for Charge: It differs depending on whether a user gives a priority to a toll road or not. Generally, the weighting factor is determined such that the pseudo-distance,of the toll road is determined to be about 1.5 times of that of a general road (which is not the toll road).

Weighting Factor for Number of Right Turn Times: It is determined such that the number of right turn times parameter become about 2 times of the number of left turn times parameter in the evaluation equation. If it is particularly desired to reduce the number of turn times, the weighting factor is determined such that the original road distance on the course is multiplied to be about 1.4–1.5 times per one right turn.

Weighting Factor for Number of Left Turn Times: It is determined such that the number of left turn times parameter become about ½ times of the number of right turn times parameter in the evaluation equation. Namely, in case that the weighting for one right turn is about 1.4 to 1.5 times, the weighting for one left turn is about 1.2 to 1.25 times.

SECOND EMBODIMENT

Figure 4:
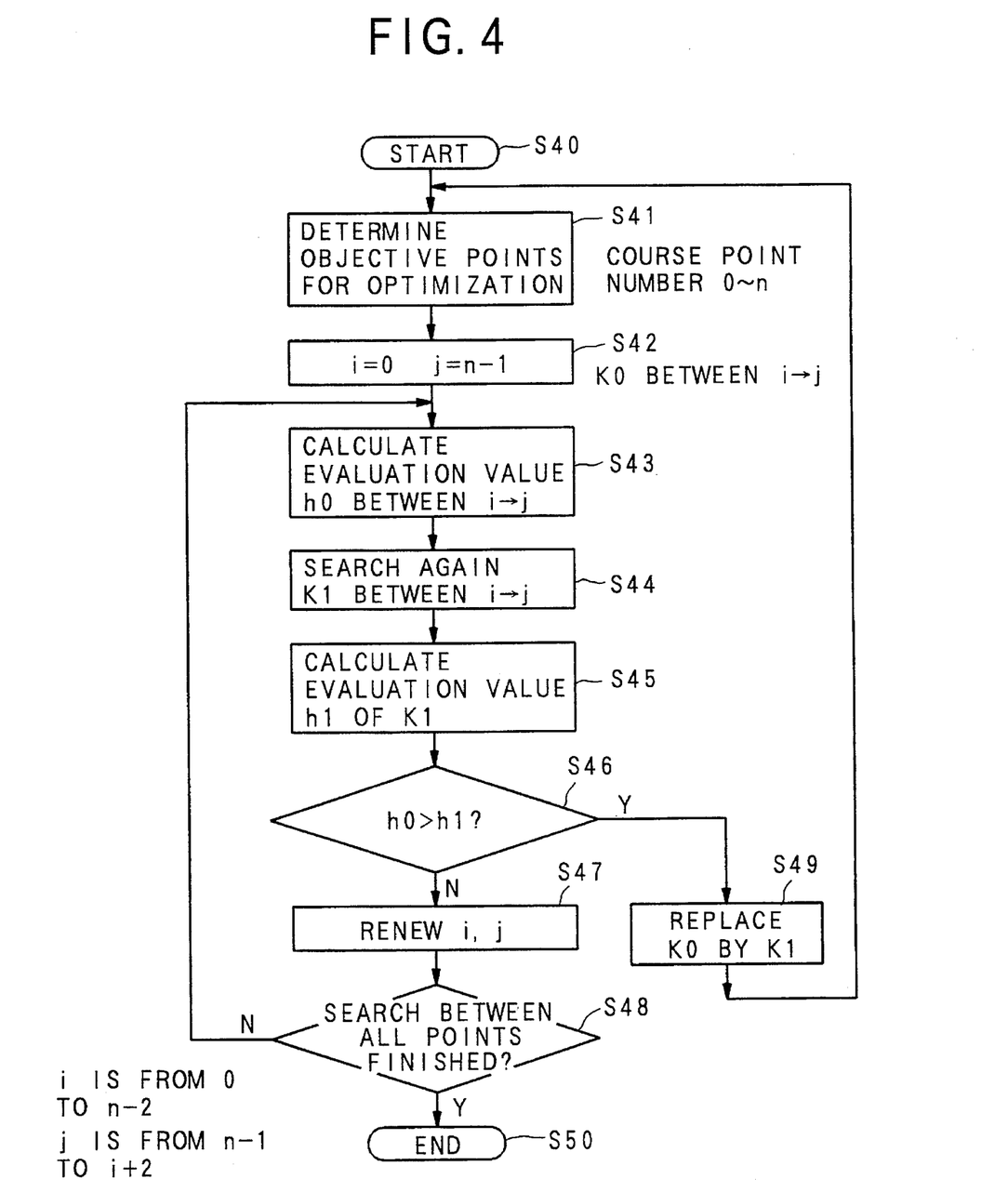
FIG. 4 is a flow chart, which indicates an operation of a second embodiment of the navigation apparatus having an optimum course searching function according to the present invention.
Figure 5:
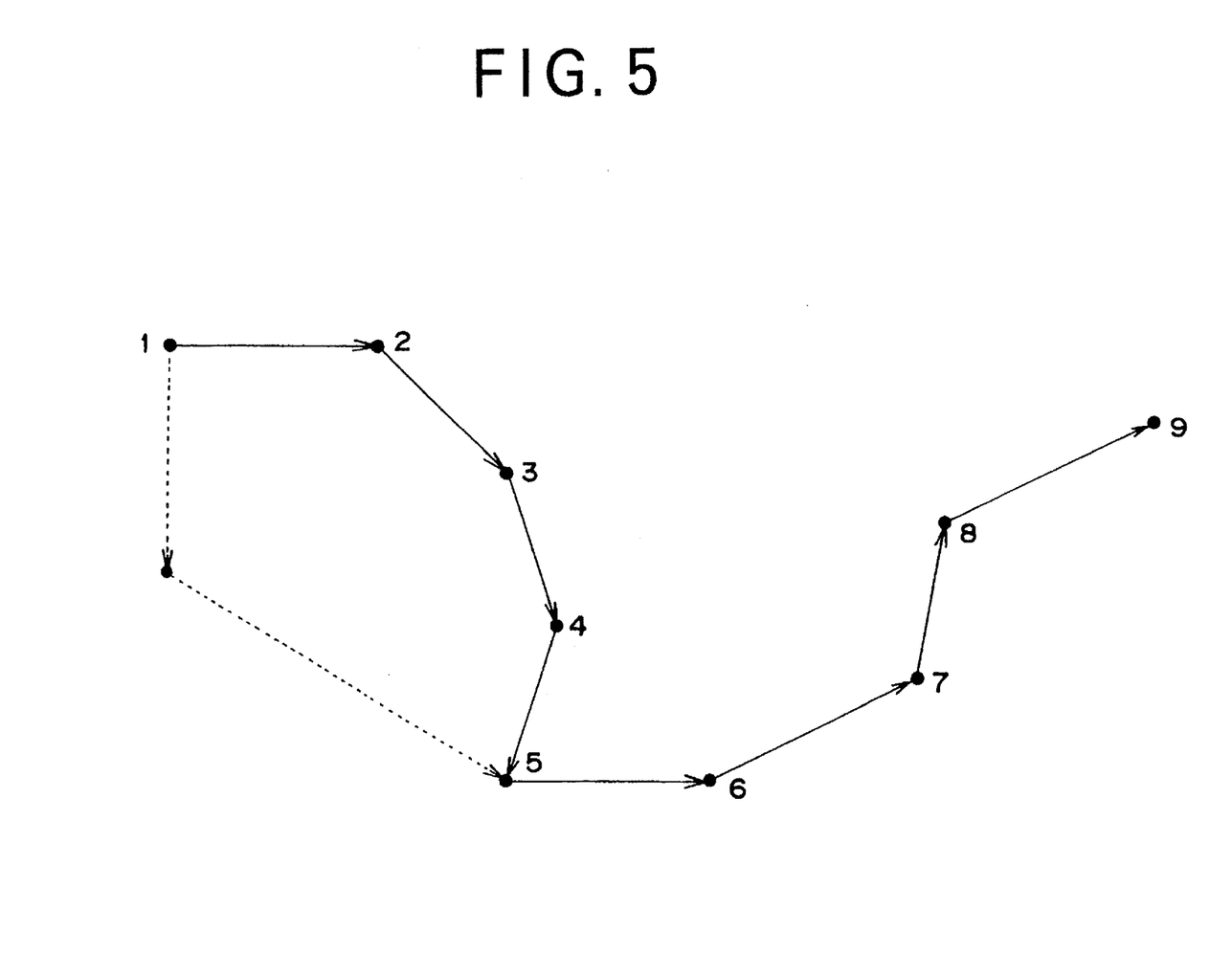
FIG. 5 is a diagram of the searching method in the embodiment.

FIG. 4 indicates a flow chart of a second embodiment of the navigation apparatus, which has the optimum course searching function of the present invention. FIG. 5 indicates a diagram of the searching method.

It is assumed that course $1 \to 2 \to 3 \to 4 \to 5 \to 6 \to 7 \to 8 \to 9$ could be searched by the search of the first embodiment, for example, as shown in FIG. 5. In the first embodiment, although the search result becomes 1 to 9 in case that the starting point is set to the point 1 and the ending point is set to the point 9, there is a possibility that a more suitable course shown by the dotted line is overlooked. Therefore, the first evaluation value for a certain course interval and the second evaluation value for the same course interval, are compared, and a more desirable course is replaced as a new course. Then, while repeating this procedure with respect to 1 to 7, 1 to 6, 1 to 5, ..., 7 to 9, when it becomes impossible to find out a more suitable course, the optimization is completed in the second embodiment.

The number of search times is shown below, in case of performing the optimization by this method. Here, N represents the number of search times, and n represents the number of course points.

$$N=(n^2-3n+2)/2 \qquad (3)$$

However, in the process of optimization, if the replacement of the course is performed, the number of course points are changed. For this reason, the number N does not necessarily become the value expressed by the expression (3).

Hereinbelow, with reference to FIG. 4, the process of optimum course search by the second embodiment will be explained.

When the optimum course search is started (step S40), the objective points for optimization are determined (step S41). Here, it is assumed that the course point number is from 0 to n. Because the number of search times is proportional to 2nd power of n, as understood from the above mentioned expression (3), if searching is performed in this manner, a considerable process time is required. Therefore, it becomes necessary to diminish the number of search times. An original purpose of optimization is to bring a bending or curved course as close to a straight line as possible. For this reason, the optimization of the interval, which is already close to a straight line, is not really necessary. Thus, the course search is performed with respect to only points between which the course is bent. Namely, points at which the course is bent, are selected as objective points for optimization (optimization between bending points). Moreover, in order to prevent a better course from being overlooked, it is also possible to limit a level of the road width. Namely, in a straight interval, if a course point, where roads having the level of the road width of search object intersect, exists, this point is also made to be the objective point for optimization.

Nextly, search intervals i and j are set. Initial values are set such that i=0 and j=n−1. One course between those is assumed to be k0 (step S42). Nextly, the evaluation value (h0) between i→j (course k0) is calculated (step S43). The calculation method of the evaluation value, and the method of weighting are the same as those of the first embodiment. Further, another course (k1) between i→j is searched again in the same manner as the first embodiment (step S44), and the evaluation value h1 of the course k1 is calculated (step S45). After this, it is judged whether it is h0>h1 or not (step S46). If it is h0>h1 (step S46, YES), it is judged that the course k1 is more suitable than the course k0, the course k0 is replaced by the course k1 (step S49), and the above mentioned steps 41 to 45 are repeated. On the other hand, if it is not h0>h1 (step S46, NO), the values i and j are renewed (step S47), and it is judged whether the investigation between all points have been finished or not (step S48). Here, i is a right number from 0 to n−2, and j is a right number from n−1 to i+2. If the search between all points is finished (step S48, YES), the optimization search is ended (step S50). If it is not completed (step S48, NO), the procedure from the above mentioned step S43 is repeated.

THIRD EMBODIMENT

Figure 6:
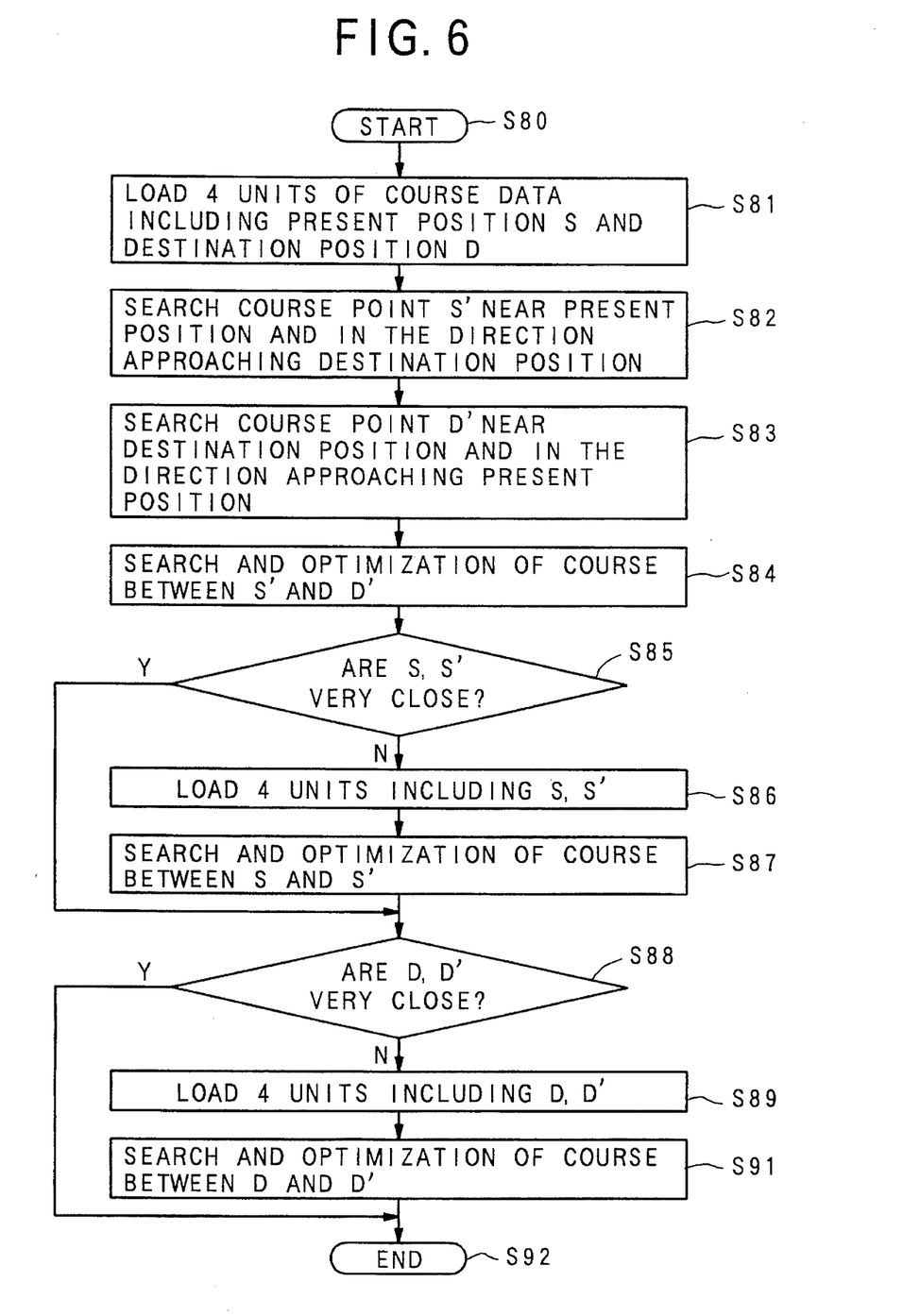
FIG. 6 is a flow chart, which indicates an operation of a third embodiment of the navigation apparatus having an optimum course searching function according to the present invention.

FIG. 6 indicates a flow chart of a third embodiment of the navigation apparatus having the optimum course searching function by the present invention. The searching method will be explained by use of FIGS. 7 and 8. In the third embodiment, in order to reduce the amount of course data to be used as much as possible, course data is hierarchized. Concretely, if the present position and the destination position are considerably separated, higher hierarchic data is used. If these are close, lower hierarchic data is used.

Figure 7:
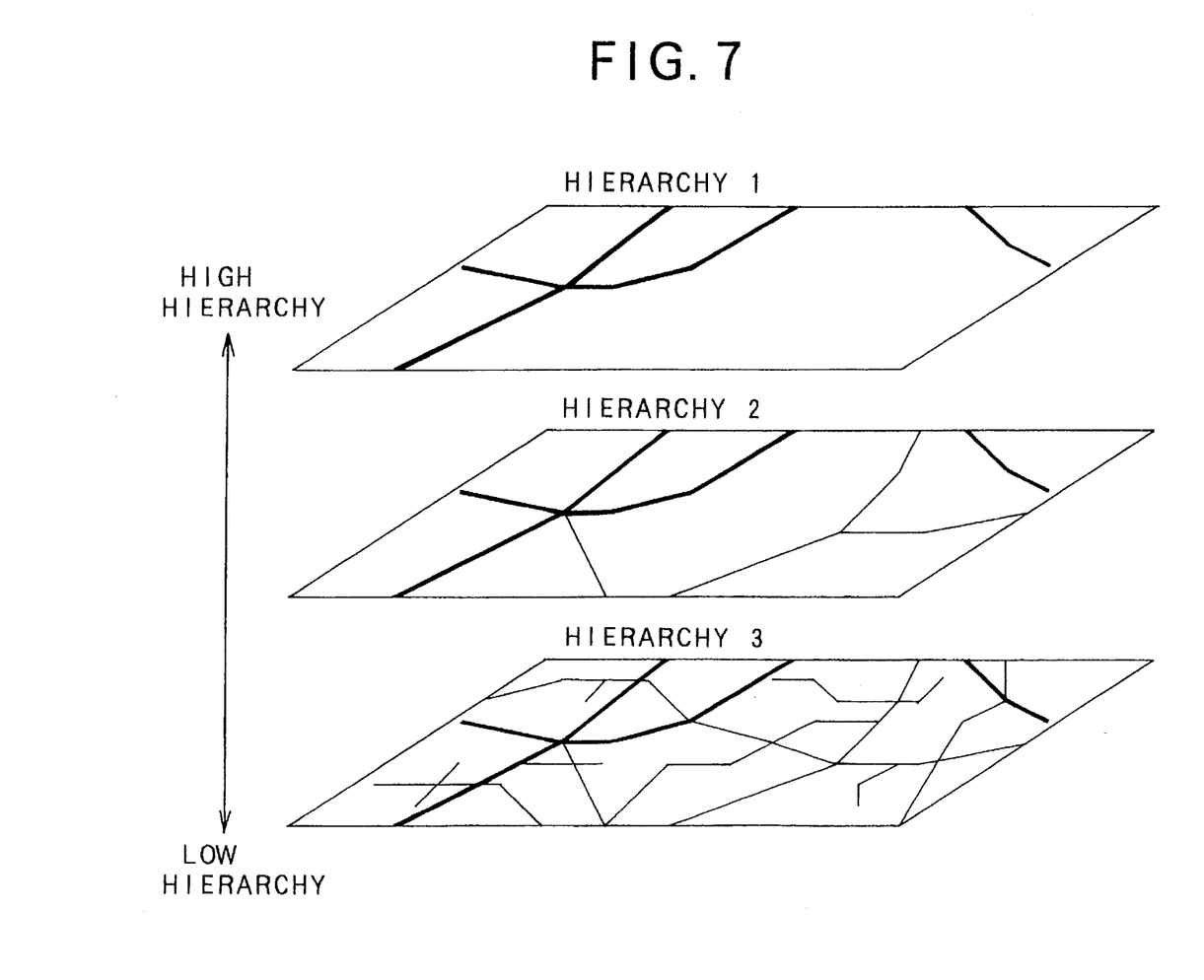
FIG. 7 is a diagram of hierarchized course data in the embodiment.

FIG. 7 indicates an example of hierarchization of course data. Here, a hierarchy 1 is a higher hierarchy of hierarchies 2 and 3. The hierarchy 3 is the lowest hierarchy. Moreover, although the hierarchies 1 to 3 indicate the same region, the size of a unit (here, a unit is defined as one square region when data is cut into a mesh) may be made larger as higher is the hierarchy. For example, the hierarchy 1 indicates a highway, a toll road and a national highway. The hierarchy 2 indicates a main road, a prefectural road, etc. The hierarchy 3 indicates a road which is narrower than those roads i.e. a thin street road etc. By hierarchizing course point data, it becomes possible to search efficiently. Namely, in case of a long distance, the search is performed in the high hierarchy (e.g. a highway, a national road, a prefectural road). In case of a short distance, the search is performed in the low hierarchy (e.g. a main road).

Figure 8:
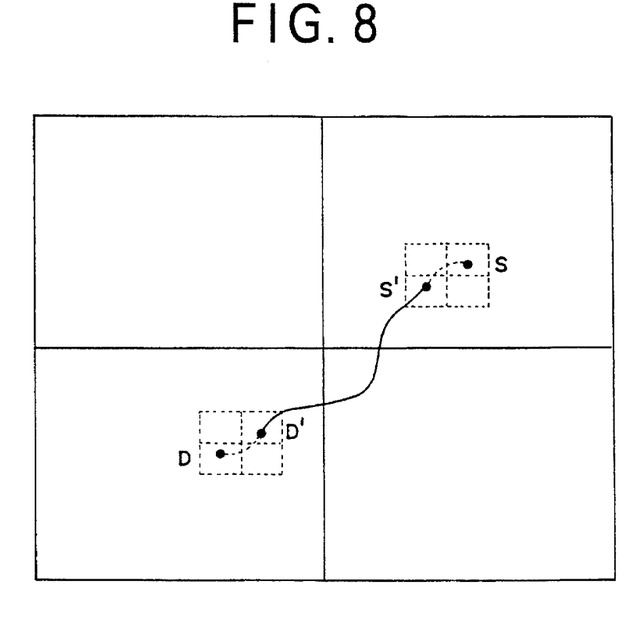
FIG. 8 is a diagram of searching in 4 units including a present position and a destination position in the embodiment.

FIG. 8 indicates a region of the search in 4 units including the present position and the destination position. In FIG. 8, when taking out the 4 units, its size is not set to be just enough to include the present position S and the destination position D, but its size is set to have a room to some extent. As indicated by a dotted line in FIG. 8, in case that the search is performed from the point D to the point D' or in case that the search is performed from the point S to the point S', the same process is performed in a smaller unit.

Hereinbelow, with reference to FIG. 6, the process of the optimum course search by the third embodiment will be explained. When the process is started (step S80), 4 units of the course data including the present position S and the destination position D, are loaded from the CD-ROM 10 (step S81). At this time, when the present position S does not exist on the loaded course data, the course point S', which is located near the present position S and in the direction approaching the destination position D, is searched (step S82). Similarly, when the destination position D does not exist on the loaded course data, the course point D', which is located near the destination position D and in the direction approaching the present position S, is searched (step S83). The course from the position S' to the position D' is subjected to the optimum searching operation according to the method of the first embodiment or the second embodiment (step S84).

Nextly, it is judged whether the position S and the position S' are very close to each other or not (step S85). Here, "very close" means that two positions are within a predetermined short distance, which may be changed by an operation input through the input device. If they are not very close (step S85, NO), 4 units of lower hierarchy, which include the positions S and S', are loaded (step S86). The course from the position S to the position S' is subjected to the optimum searching operation according to the method of the first embodiment or the second embodiment (step S87). On the other hand, when the position S and the position S' are very close to each other (step S85, YES), the above mentioned steps 87 and 86 are omitted, and the following processes are performed.

Further, it is judged whether the position D and the position D' are very close to each other or not (step S88). If they are not very close (step S88, NO), 4 units of lower hierarchy including the position D and the position D', are loaded (step S89). The course form the position D to the position D' is subjected to the optimum searching operation according to the method of the first embodiment or the second embodiment (step S91). On the other hand, if the position S and the position S' are very close to each other (step S88, YES), the above mentioned steps 89 and 91 are omitted, and the process is completed (step S92).

In addition, it is also possible to change the time interval between each search by use of the hierarchy. Namely, in case of searching a far position, it is preferable to perform each search less frequently i.e. with a long time interval since a rough search is firstly performed, while, in case of a near point, it is preferable to perform each search more frequently i.e. with a short time interval since a fine search is performed.

Figure 9:
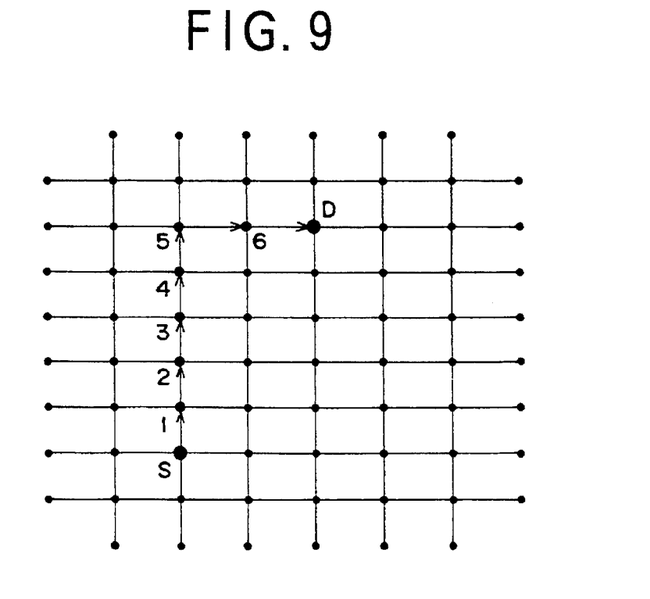
FIG. 9 is a diagram which indicates a search course in case of using the navigation apparatus of the present embodiment.
Figure 10:
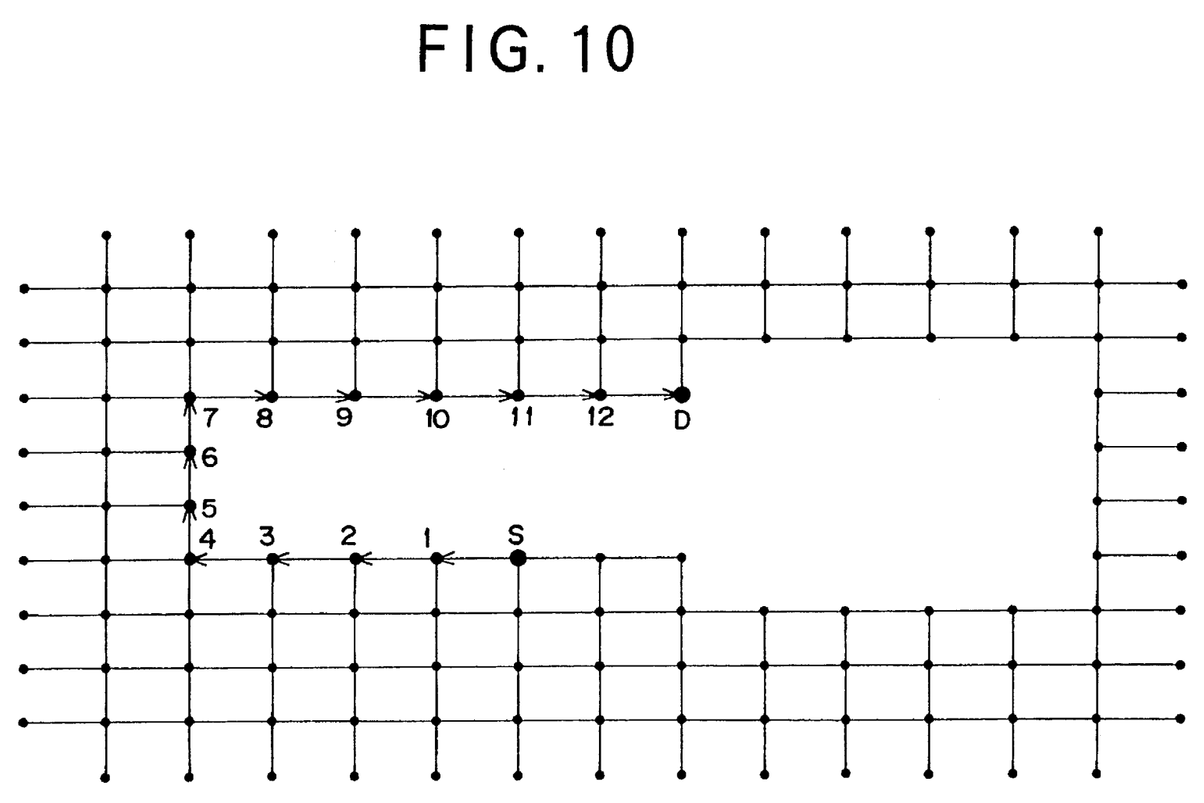
FIG. 10 is another diagram which indicates a search course in case of using the navigation apparatus of the present embodiment.

The search course in case of searching the same course as shown in FIGS. 11 and 12 by use. of the navigation apparatus of the present invention, are shown in FIG. 9 and FIG. 10, respectively. The course with less number of turn times is selected by the present embodiment, in FIG. 9. The course having the short road distance is selected by the present embodiment, in FIG. 10. By comparing those with the courses selected in FIGS. 11 and 12, the advantageous effect of the present invention can be easily understood.

According to the above described constitution of the navigation apparatus of the present invention, weighting of evaluation parameters can be changed in dependence on a user's demand, so that a course which matches to the user's demand, can be selected. Especially, the straight advance nature of a course is taken into consideration, so that it is possible to search a course which number of the right and left turn times is small. Moreover, since the evaluation is performed concurrently with the search, the process can be performed at high speed while maintaining the accuracy of the search. And that, the search can be conducted while estimating a better course on real time. Therefore, even when the car deviates from the original course, it can correspond quickly. Moreover, by stopping the search of the course which evaluation value is likely to become degraded at an early stage, a useless search can be avoided, so that it becomes possible to improve the processing speed.

Moreover, since objective points can be drastically decreased in the optimization between bending points, it is possible to improve the processing speed. By taking the level of the road width into consideration so as to search a course, which cannot be found only between the bending points, or by limiting the level of the road width, e.g. by excluding a road which width is less than 5.5 m, for example, out of the search object, the processing speed can be improved. Further, by limiting the classification of the road as the search object, the processing speed can be improved.

Furthermore, by hierarchizing course data, the search can be performed efficiently for a short time period.

The inventions may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A navigation apparatus, equipped in a movable body, comprising:

a position measuring means for measuring a self-position of the movable body;

an input means for inputting a destination position;

a displaying means for displaying a present position, which is measured by said position measuring means, and an optimum course from the present position to the destination position;

a memory means for storing map information including course data beforehand; and an optimum course searching means coupled to said memory means and said displaying means, for selecting points, at which a course is bent and not selecting points at which the course is straight, from among points on various courses from the present position to the destination position as objective points for optimization by use of the map information stored in said memory means, evaluating said bent courses between the selected objective points without evaluating the straight courses from among the non-selected points and searching the optimum course by selecting a course, which evaluation is the best one among the evaluated various courses, as the optimum course.

2. A navigation apparatus as set forth in claim 1, wherein said optimum course searching means evaluates the various courses on the basis of a predetermined function of parameters, which comprise at least one of a road distance, a road width, a degree of traffic jam, a straight advance nature of a road, a road charge, the number of right turn times and the number of left turn times, in the map information.

3. A navigation apparatus as set forth in claim 2, wherein the predetermined function is a weighted sum of the parameters with weighting factors.

4. A navigation apparatus as set forth in claim 1, wherein said optimum course searching means calculates a pseudo-distance from the present position to the destination position along each of the various courses as a predetermined function of parameters, which comprise at least one of a road distance, a road width, a degree of traffic jam, a straight advance nature of a road, a road charge, the number of right turn times and the number of left turn times, in the map information, and selects the optimum course on the basis of the calculated pseudo-distance.

5. A navigation apparatus as set forth in claim 4, wherein the predetermined function is a weighted sum of the parameters with weighting factors.

6. A navigation apparatus as set forth in claim 5, wherein the weighting factors are variable by an operation input through said input means.

7. A navigation apparatus as set forth in claim 1, wherein said position measuring means comprises at least one of an earth magnetism sensor, a gyroscope, a travelling distance sensor and a GPS measurement device.

8. A navigation apparatus as set forth in claim 1, wherein said memory means comprises at least one of a CD-ROM and an IC card.

9. A navigation apparatus as set forth in claim 1, wherein said optimum course searching means evaluates the various courses within an oval on a map, which focuses are located at the present position and the destination position respectively, and selects the optimum course among the evaluated various courses within the oval.

10. A navigation apparatus as set forth in claim 1, wherein said optimum course searching means determines a prohibited point, which has no possibility to be selected as a point in the optimum course, and evaluates the various courses which do not include the prohibited point.

11. A navigation apparatus as set forth in claim 1, wherein said optimum course searching means selects a wide course, which width is not less than a predetermined width, among the various courses, and evaluates the wide course without evaluating a course which width is less than the predetermined width among the various courses.

12. A navigation apparatus as set forth in claim 1, wherein said optimum course searching means selects the optimum course such that the optimum course searching means successively compares evaluations of the evaluated courses, and stops evaluating one course halfway when an evaluation of said one course is worse than that of another course, which has been already evaluated, according to a comparison result.

13. A navigation apparatus as set forth in claim 1, wherein said memory means stores the map information in hierarchic structure, and said optimum course searching means evaluates the various courses with respect to one of hierarchy of the map information.

14. A navigation apparatus as set forth in claim 13, wherein said optimum course searching means evaluates a high hierarchy of the map information when the destination position is far from the present position, and evaluates a low hierarchy of the map information when the destination position is near the present position.

15. A navigation apparatus as set forth in claim 13, wherein the memory means stores the map information such that one data unit in a high hierarchy of the map information covers a large area of a map, and one data unit in a low hierarchy of the map information covers a small area of a map.

16. A navigation apparatus as set forth in claim 13, wherein said optimum course searching means evaluates the various courses for a variable time period depending on a level of hierarchy of the map information.

17. A navigation apparatus as set forth in claim 13, wherein said optimum course searching means searches the optimum course periodically such that a time interval between each search is varied depending on a level of hierarchy of the map information.

* * * * *